United States Patent [19]

Yoder

[11] 4,310,843

[45] Jan. 12, 1982

[54] ELECTRON BEAM CONTROLLED ARRAY ANTENNA

[75] Inventor: Max N. Yoder, Washington, D.C.

[73] Assignee: The United States of America as represented by the Secretary of the Navy, Washington, D.C.

[21] Appl. No.: 24,937

[22] Filed: Mar. 6, 1970

[51] Int. Cl.[3] .......................... G01S 3/38; H01Q 1/26

[52] U.S. Cl. .............................. 343/100 SA; 315/34; 343/701

[58] Field of Search ........................ 343/100 SA, 701; 315/34

[56] References Cited

U.S. PATENT DOCUMENTS

| | | | |
|---|---|---|---|
| 2,691,076 | 10/1954 | Moore et al. | 330/13 |
| 3,080,523 | 3/1963 | Miller | 343/701 X |
| 3,392,393 | 7/1968 | Spitz | 343/754 |

*Primary Examiner*—Malcolm F. Hubler

*Attorney, Agent, or Firm*—R. S. Sciascia; William T. Ellis

[57] ABSTRACT

An array antenna capable of simultaneously radiating several microwave patterns wherein the antenna elements are individually energized by p-n junction devices that are controlled by electron beams.

9 Claims, 1 Drawing Figure

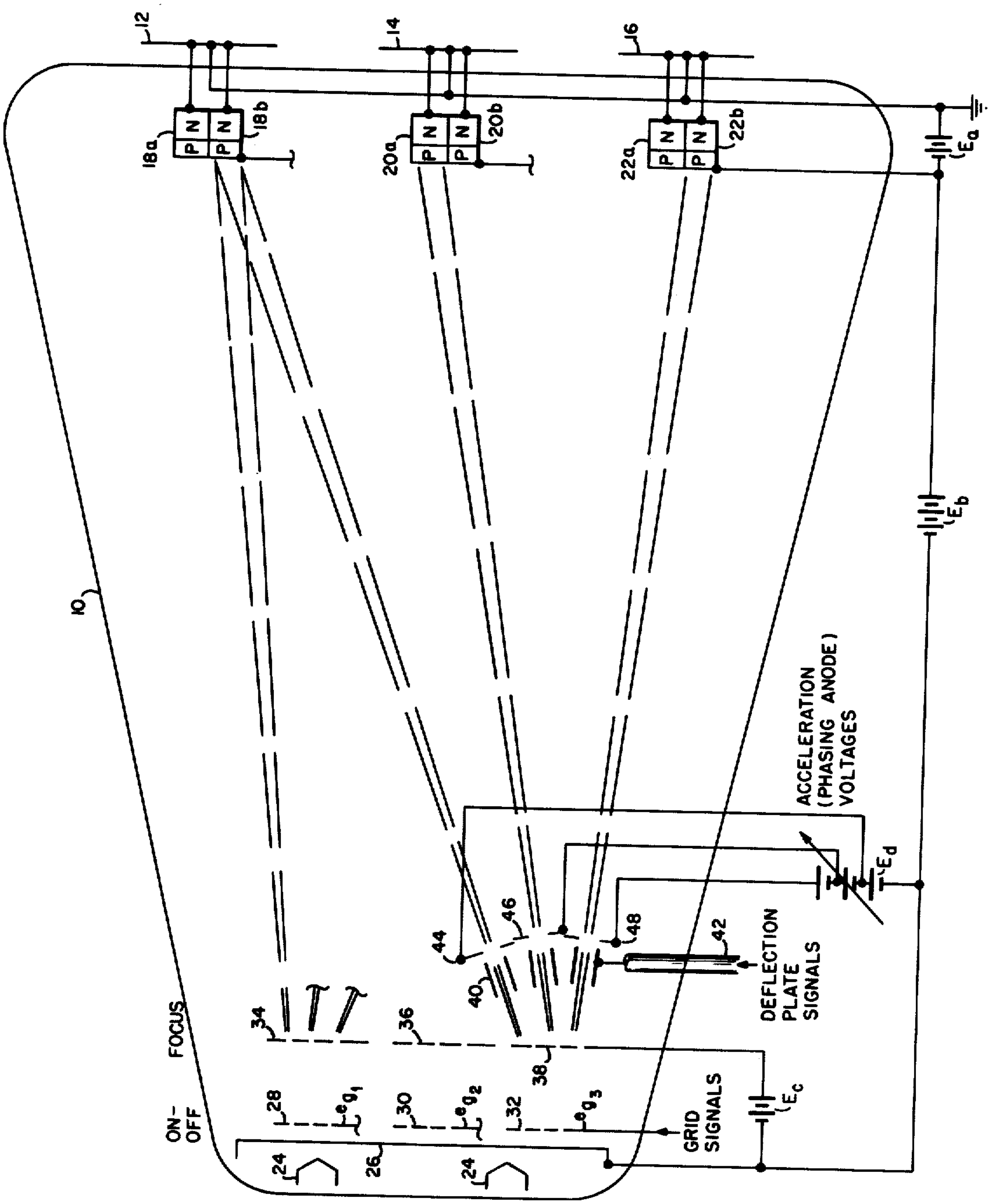
12
14
16
18a
18b
20a
20b
22a
22b
N
P
$E_a$
$E_b$
$E_c$
$E_d$
10
ACCELERATION (PHASING ANODE) VOLTAGES
DEFLECTION PLATE SIGNALS
GRID SIGNALS
FOCUS
ON-OFF
24
26
28
30
32
34
36
38
40
42
44
46
48
$e_{g_1}$
$e_{g_2}$
$e_{g_3}$

ELECTRON BEAM CONTROLLED ARRAY ANTENNA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Both the use and radiation theory of array antennas are well known, in fact, many of the early radars developed in the late 1930s used array antennas. The frequencies of these early radars were generally VHF or lower UHF, i.e. relatively low by present day standards, and with the development of microwave radar and the application of optical techniques to microwaves, the interest in array antennas for radar applications waned in favor of reflector type antennas.

However, the array antenna has a basic advantage over other types of antennas, such as reflectors, because of the inherent ability to electronically steer the radiation pattern, or beam, without the necessity of moving mechanical structures. This basic advantage of array antennas is augmented by other advantages, such as better sidelobe control, simultaneous radiation of several patterns, higher efficiencies because of absence of spillover loss, etc.

The major disadvantages which, particularly for higher frequencies, limit the use of array antennas are the difficulty, complexity and cost of precisely controlling the phase of the energization of each of the antenna elements.

Further, conventional array antennas are not capable of simultaneously radiating multiple beams of energy in such a manner as to give to each beam a completely independent control of its frequency, position and power.

It is, therefore, an object of the present invention to provide an improved array antenna.

Another object is the provision of an improved array antenna wherein the individual elements are energized by p-n junction devices which are controlled by electron beams.

A still further object is to provide an array antenna which is capable of simultaneously radiating several microwave patterns and wherein the individual elements are energized by p-n junction devices which are controlled by electron beams that can be precisely phase, amplitude and frequency modulated.

DESCRIPTION OF THE DRAWING

Other objects and advantages of the invention will hereinafter become more fully apparent from the disclosure made in the following description of a preferred embodiment of the invention as illustrated in the single FIGURE of the drawing.

DESCRIPTION OF THE INVENTION

It may now be helpful to acquaint the reader with literature and technology that collaterally relates to certain aspects of the preferred embodiment of the invention herein described and illustrated.

As reported in the January 1963 IEEE Transactions on Electron Devices, A. V. Brown was one of the early investigators considering the possibility of using an electron-beam-controlled back-biased p-n junction to obtain a high-speed, high-powered switching circuit having rise and decay times of only several nanoseconds. Later efforts at Stanford University optimized structural relationships to obtain switching circuits having rise times of 10 picoseconds and resulted in the construction of a cathode ray tube wherein the deflection plates were coaxially fed and the electron beam faithfully followed microwave signals in excess of 12 GHz.

The reader is now referred to the drawing with the caution that the single FIGURE should not be construed as being more than merely representative of practical structure. Obviously, much of the drawing and many of the features of the disclosed embodiment are dimensionally distorted and extremely simplified for the purpose that the disclosure of the invention might be presented in a manner having clarity of illustration and description.

In the drawing, the reference numeral 10 identifies an evacuated envelope made of dielectric material, such as glass. A three element phased array antenna 12, 14 and 16 is mounted exteriorly on the face of envelope 10. All of the array elements 12, 14 and 16 are center connected to ground and, as shown, are energized as the load of pairs of back-biased p-n junction devices 18*a* and *b*, 20*a* and *b*, and 22*a* and *b*, respectively, all of which are located inside envelope 10. While the back bias $E_a$ for the p-n junction devices, and other yet to be described potentials, are illustrated as batteries, it will be apparent that these potentials can alternatively, and much more conveniently, be usually obtained from other sources of DC potential. It will also be recognized that other quantities and arrangements of array elements and associated electronic drives, may be used, particularly when it is recalled that the length of a half wave dipole at 10 GHz is only 1.5 cm. Further, persons skilled in the electronic arts will realize that the distance between the center (grounded) point of the array elements and the feed points must be adjusted to obtain a match between the antenna impedance and the impedance of the various junction devices. Also, with the p-n diode pairs located adjacent to each other, as shown, Class AB amplifier operation results. If the diodes are separated by the width of the electron beam such that the electron beam in its quiescent (no deflection) state impinges between the diode, then a more efficient Class B amplifier operation will result.

In the other end of envelope 10, heaters 24 and cathode 26 produce a supply of electrons which, in a manner soon to be described, are controlled to form beams that selectively bombard the pairs of junction diodes 18*a* and *b*, 20*a* and *b* and 22*a* and *b* at a velocity related to the accelerating potential $E_b$. The grids 28, 30 and 32 are connected to individually receive grid signals $e_{g1}$, $e_{g2}$ and $e_{g3}$ which function to either repulse the electrons back into the cathode 26 or to pass electrons in the form of unfocused streams. It will be apparent, of course, that the streams of passing electrons can also be amplitude modulated by varying grid signals. In other words, the grids 28, 30 and 32 serve both as the on-off control for three electron guns and as current amplitude modulation devices for each of the guns when it is in the "on" state.

Each of the streams of electrons passing through grids 28, 30 and 32 is focused into three beams by the anodes 34, 36 and 38 which are each connected to the accelerating potential $E_c$. For example, when the grid 32 is in the "on" condition, three beams will be focused by anode 38. These three beams, after further electronic accelerations and deflections, will individually bombard one half or the other of the devices 18, 20 and 22.

The three beams focused by anode 38 are deflected and frequency modulated by the six deflection plates 40 that are connected to receive deflection signal, preferably at microwave frequency, which is received through a lead 42, usually a coaxial cable. For broad-band operation a travelling wave feed deflection technique may be preferred to the connection shown. Beams focused by anodes 34 and 36 are similarly deflected by non-illustrated deflection plates that are energized by deflection signals that are usually at a different frequency than the signal delivered in lead 42.

As shown in the drawing, the three beams that originate in the stream of electrons gated through grid 32, which are focused by anode 38 and are deflected and frequency modulated by plates 40, are also accelerated by second anodes 44, 46 and 48 which are at selectively different potentials, as is schematically illustrated by the variable connection to the potential source $E_d$.

The operation of the illustrated embodiment of the invention is by now, no doubt, apparent. Electrons emitted by the heated cathode 26 are gated by the independently controlled grids 28, 30 and 32. For the purpose of this description it will be assumed that all three of the grids 28, 30 and 32 are in the "on" condition and that streams of electrons pass through these grids. However, it is emphasized that one or more of the grids may be in the "off" condition and not permit electrons to stream through the grid, or that one or more of the grids is receiving varying signals which amplitude modulate the current flowing through the grid and, as will be explained more fully later, modulate the strength of the antenna pattern associated with the modulating grid and radiated by the array 12, 14 and 16.

Assuming that all three of the grids 28, 30 and 32 are in the "on" condition, the focusing anodes 34, 36 and 38, form nine electron beams. Only the structure 40, 42, 44, 46 and 48 for deflecting and phase controlling the beams associated with grid 32 has been illustrated, but the reader should recognize that similar structure exists for operating on the six beams associated with grids 28 and 30 and with focusing anodes 34 and 36.

The microwave signal carried by coaxial cable 42, which can be frequency modulated, is simultaneously applied to the three pairs of deflection plates 40 which are associated with the three beams focused by anode 38. The different accelerating voltages on anodes 44, 46 and 48 cause different deflection phasing of these three beams as they bombard the p-n junction devices 18, 20 and 22, although all of the beams arrive at the junctions with the same electron velocities which are, of course, related to the voltage $E_b$. This difference in deflection phasing can be observed from the drawing wherein the top and bottom beams are deflected downward to bombard the p-n junction device 18*b* and 22*b* while the middle beam is deflected upward to bombard the junction device 20*a*. As is well known to persons familiar to the theory of array antennas, the phasing of signals applied to the array elements 12, 14 and 16 (which is, of course, related in an obvious way to the deflection phasing of the beams bombarding the p-n junction devices 18, 20 and 22) determines the angle at which the antenna pattern is radiated. It is to be appreciated that the time delay imparted to each electron beam between deflection and target impact is completely independent of the frequency at which the electron beam is transversely deflected. Thus, the phase versus frequency characteristic of the radiated energy of each array element is extremely linear over a very broad frequency range, i.e. it is dispersionless. It will also be evident to persons skilled in the electronic arts that the deflection and phasing functions and the potentials of the structure 40, 44, 46 and 48 could be combined, i.e. a single structural member charged with an appropriately varying deflecting and accelerating potential could be used in place of structural members 40 and 44.

Inasmuch as the operation of the p-n junction devices and of the array elements is essentially linear, the three beams focused by anode 34 and the three beams focused by anode 36 can also utilize junction devices 18, 20 and 22 and the array elements 12, 14 and 16 to radiate independent antenna patterns. This mutual use has been shown in the illustration wherein junction 18*b* is instantaneously being bombarded by beams from anodes 34 and 38. It is preferable, but not absolutely essential, that the frequency of the microwave deflection signals for the various radiated patterns be different.

The device described can radiate patterns of substantial power. For example, if the back-biased p-n junction devices 18, 20 and 22 are composed of silicon material, it is known that one electron-hole pair is produced at the junction for every 3.6 e.V. of energy impinging upon the device by the electron beam. Thus if, as is considered typical, $E_b$=10,000 volts, a 34 db current gain is realized without considering the gains obtainable from the deflection modulation processes. These latter gains can amount to an additional 20 db. P-n junctions have been constructed to produce an output current of 46 amperes into a 2.25 ohm load with a rise time of 0.2 nanoseconds. Devices with reduced outputs can be made to have rise times which are an order of magnitude faster. Also special beam deflection modulators can be used which modulate a rectangular shaped electron beam that can be made to impinge on strip line p-n diode targets in a manner that each target will produce up to 10 KW of CW microwave power.

There has been disclosed an embodiment of an invention that provides an array antenna which is capable of simultaneously radiating several microwave patterns and wherein the individual antenna elements are energized by p-n junction devices which are controlled by electron beams that can be precisely phase, amplitude and frequency modulated. It should be understood, of course, that the foregoing disclosure relates to only a preferred embodiment of the invention and that numerous modifications or alterations may be made therein without departing from the spirit and the scope of the invention as set forth in the appended claims.

What is claimed and desired to be secured by Letters Patent of the United States is:

1. An array antenna and feed comprising:
a plurality of antenna elements;
a plurality of semiconductor diode devices equal in number to twice the number of said plurality of antenna elements, said plurlity of diode devices being arranged in pairs, each pair being connected to a different antenna element and
electron beam producing means for bombarding said pairs of semiconductor diode devices with modulated streams of high velocity electrons
whereby said array antenna radiates patterns which are related to the modulation of said electron streams.

2. The array antenna and feed of claim 1 wherein said modulated streams of electrons are individually deflectable to alternatively bombard one or the other diode of one of said pairs of diodes.

3. The array antenna and feed of claim 1 wherein said electron beam producing means include modulating means for independently amplitude, phase and frequency modulating each of said streams of electrons.

4. The array antenna and feed of claim 1 wherein said electron beam producing means include means which independently focus and accelerate each of said streams of electrons.

5. The array antenna and feed of claim 1 wherein said plurality of semiconductor diode devices and said electron beam producing means are located in an evacuated envelope.

6. The array antenna and feed of claim 1 wherein said antenna elements are center grounded dipoles connected on each side to be impedance matched to one of said pairs of diode devices.

7. The array antenna and feed of claim 1 wherein said electron beam producing means include means which function to independently focus, accelerate, amplitude modulate, frequency modulate, phase modulate and deflect each of said streams of electrons, said deflections being such that each stream alternatively bombards one or the other diode of one of said pairs of diodes.

8. The array antenna and feed of claim 7 wherein said plurality of semiconductor diode devices and said electron beam producing means are located in an evacuated envelope and said antenna elements are center grounded dipoles connected on each side to be impedance matched to one of said pair of diode devices.

9. An array antenna capable of simultaneously radiating several patterns of microwave energy comprising:

cathode means for producing a source of free electrons;

several grid means equal in number to the number of microwave energy patterns said antenna is capable of simultaneously radiating, said several grid means being connected to be individually controllable and individually functioning to either prevent passage of electrons from said cathode means or to allow passage of amplitude modulated streams of electrons from said cathode means;

a plurality of pairs of semiconductor diodes connected to be at an electron accelerating potential relative to said cathode means;

a plurality of center grounded dipoles equal in number to said plurality of pairs of semiconductors and individually connected on each side to be impedance matched to one of said pairs of diode devices;

several focusing means equal in number to and individually associated with said several grid means, and individually functioning to focus a stream of electrons passed by a grid means into a plurality of electron beams equal in number to said plurality of pairs of semiconductor diodes, said plurality of beams alternatively bombarding one or the other diode of different ones of said plurality of diode pairs;

deflecting and phase modulating means for controlling by varying potentials the relative phase relationship of the alternative bombarding of said diode pairs by said electron beams and an evacuated envelope enclosing said cathode means, said several grid means, said plurality of pairs of semiconductor diodes, said several focusing means and said deflecting and phase modulating means.

* * * * *